(12) United States Patent
Kwok (10) Patent No.: US 9,977,883 B2
(45) Date of Patent: *May 22, 2018

(54) METHOD AND APPARATUS FOR CREATING SWITCHABLE DESKTOPS WITH SEPARATE AUTHORIZATIONS

(71) Applicant: Centrify Corporation, Santa Clara, CA (US)

(72) Inventor: Hon Wai Kwok, Sunnyvale, CA (US)

(73) Assignee: CENTRIFY CORPORATION, Santa Clara, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/147,787

(22) Filed: May 5, 2016

(65) Prior Publication Data

US 2016/0246952 A1 Aug. 25, 2016

Related U.S. Application Data

(63) Continuation of application No. 14/052,591, filed on Oct. 11, 2013, now Pat. No. 9,378,391.

(51) Int. Cl.
*G06F 21/31* (2013.01)
*G06F 21/62* (2013.01)
*G06F 3/0481* (2013.01)
*G06F 3/0484* (2013.01)

(52) U.S. Cl.
CPC ............ *G06F 21/31* (2013.01); *G06F 3/0481* (2013.01); *G06F 3/0484* (2013.01); *G06F 21/6218* (2013.01); *G06F 2221/2117* (2013.01); *G06F 2221/2141* (2013.01)

(58) Field of Classification Search
CPC ......... G06F 21/6218; G06F 2221/2141; G06F 2221/2117; G06F 21/31; G06F 3/0484; G06F 3/0481
See application file for complete search history.

(56) References Cited

U.S. PATENT DOCUMENTS

| | | | |
|---|---|---|---|
| 6,807,666 B1 | 10/2004 | Evans et al. | |
| 7,502,794 B2 * | 3/2009 | Pelz | G06F 21/604 |
| 8,776,209 B1 | 7/2014 | Kumar et al. | |

(Continued)

*Primary Examiner* — Hadi S Armouche
*Assistant Examiner* — Cheng-Feng Huang
(74) *Attorney, Agent, or Firm* — Womble Bond Dickinson (US) LLP (57) ABSTRACT

A system and method for creating switchable desktops each with its own authorization. The system provides a custom authentication and authorization data store that defines permission sets called roles, and lists which roles each user may assume. The system also provides a custom virtual desktop manager that creates new virtual desktops using the permissions defined by roles allowed for each user. When a user requests a new virtual desktop and role from the desktop manager, the manager requests new virtual desktop components from the operating system. The desktop manager intercepts a request by the operating system to the Local Security Authority module for permissions to grant the new virtual desktop. The manager substitutes the user's requested role permissions (if the user may assume the rule) for the permissions granted by the LSA module. The LSA module and operating system grant those role permissions to the user's activities in a newly created virtual desktop.

10 Claims, 8 Drawing Sheets

(56) References Cited

U.S. PATENT DOCUMENTS

| | | | |
|---|---|---|---|
| 2003/0189597 A1 | 10/2003 | Anderson et al. | |
| 2007/0171921 A1* | 7/2007 | Wookey | G06F 3/1415 370/401 |
| 2008/0184225 A1 | 7/2008 | Fitzgerald et al. | |
| 2009/0100005 A1 | 4/2009 | Faitelson et al. | |
| 2009/0100503 A1 | 4/2009 | Doyle | |
| 2009/0210934 A1* | 8/2009 | Innes | G06F 21/305 726/7 |
| 2009/0288084 A1* | 11/2009 | Astete | G06F 9/45533 718/1 |
| 2009/0325562 A1* | 12/2009 | Hough | H04M 1/725 455/418 |
| 2010/0058340 A1* | 3/2010 | Kamada | G06F 21/6218 718/1 |
| 2010/0211663 A1* | 8/2010 | Barboy | G06F 17/30233 709/223 |
| 2011/0126110 A1* | 5/2011 | Vilke | G06F 9/54 715/736 |
| 2011/0131572 A1 | 6/2011 | Elyashev et al. | |
| 2011/0191834 A1 | 8/2011 | Singh et al. | |
| 2011/0209064 A1 | 8/2011 | Jorgensen et al. | |
| 2012/0066760 A1* | 3/2012 | Anderson | G06F 21/6218 726/17 |
| 2012/0072910 A1* | 3/2012 | Martin | G06F 9/45533 718/1 |
| 2012/0089666 A1 | 4/2012 | Goswami et al. | |
| 2012/0096271 A1 | 4/2012 | Ramarathinam et al. | |
| 2012/0137360 A1* | 5/2012 | Henderson | G06F 21/6218 726/17 |
| 2014/0281030 A1* | 9/2014 | Cui | H04L 43/026 709/244 |

\* cited by examiner

METHOD AND APPARATUS FOR CREATING SWITCHABLE DESKTOPS WITH SEPARATE AUTHORIZATIONS

BACKGROUND

A desktop is the arrangement of windows, icons, and menus in a computer's graphical user interface (GUI) that allows the user to control the computer and that reflects the state of that use. A virtual desktop is a desktop that exists beyond a computer's current display. A virtual desktop may, for example, stretch the boundaries of a standard desktop to extend beyond the visible display. A virtual desktop may also exist undisplayed, stored in memory but not visible to the user unless he asks to see it.

A single computer may support multiple virtual desktops. A user on the computer can create multiple virtual desktops and then switch among them when desired. Each virtual desktop maintains an independent state of user interaction, showing actions taken within that desktop: applications started, windows opened, results of actions, icons arranged, and so on.

Because each virtual desktop maintains a separate state of user interaction, virtual desktops are a useful tool for creating separate work environments for a user, much like creating separate rooms in a house for different activities such as a workshop, a laundry room, an office, and so on. Each virtual desktop is set up with running applications, window placement, desktop tools, and other user interface elements to support a specific set of activities. A user may, for example, create one desktop for checking personal email and browsing the web, another desktop for a complex task such as editing video, and another desktop for high-privilege management such as network administration work.

As a user works in different virtual desktops within a single user session (that is, all activity that happens after the user logs on), the user's permissions to use computer resources (his authorization) are the same in each desktop. Those permissions apply to each application and other processes that the user launches in that desktop. When the user logs onto the computer and is authenticated, the computer determines the user's authentication for that session. That authorization persists for the duration of the user's session across all virtual desktops.

If, for example, a user logs onto a computer with a user account that has authorization to run simple programs like a web browser or a word processor, but does not have authorization to connect to other computers in the network and work on those computers, that authorization is the same in all of the user's virtual desktops regardless of the intent of each desktop.

A user can, if desired, launch programs in a desktop that execute using a different authorization than the desktop has. In a Windows environment, a user can execute the "runas.exe" command, which accepts a new user name, password, and name of a program to execute. If the new user account is valid, Windows executes the program using the privileges of that new user. A user in a low-privilege desktop can, for example, use runas.exe to execute a program under the "admin" account to gain high-level authorization for the program. The command "sudo" does much the same in UNIX and UNIX-like environments.

Virtual Desktop Components in Windows

Figure 1:
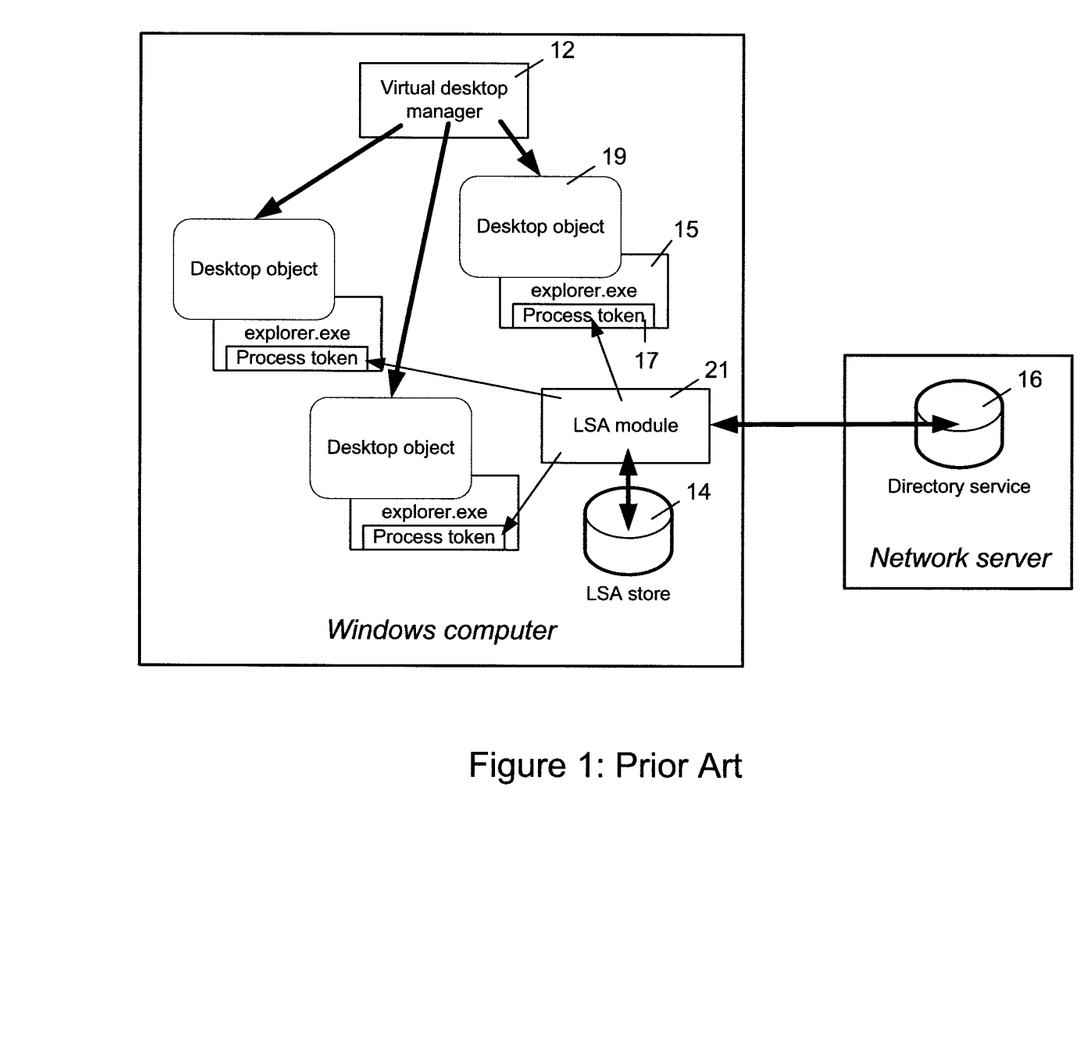
FIG. 1 is a block diagram that shows the components used to create virtual desktops in prior art on a Windows computer that communicates with a directory service on a network server.

Referring to FIG. 1, current versions of the Windows operating system use a set of components to determine a user's permissions and to handle virtual desktops. Those Windows components are:

a) The explorer.exe task 15, which runs on a Windows computer when a user logs on. Explorer.exe 15 is the Windows version of a user shell that handles the user interface interactions behind the user's initial desktop. If the user creates virtual desktops using one type of virtual desktop manager 12 (described below), the manager creates a separate instance of explorer.exe 15 to run behind each virtual desktop and to handle each virtual desktop's user interface interactions.

b) Process tokens 17, each of which identifies a user and lists the groups to which he belongs. Each group determines a set of permissions on the computer. A user's permissions are the sum of the permissions specified by the groups to which he belongs. Each process running on the computer has an associated process token 17 that Windows examines whenever the process attempts to carry out an action. The permissions defined by a process's token 17 limit the actions the process can carry out.

c) The Local Security Authority (LSA) module 21, which runs on each Windows computer, logs on users, and specifies a process token 17 at each log-on that persists for the user's session. Each time a user starts a process, the LSA module 21 assigns the session's process token 17 to the process. The first process that gets the user's process token 17 is the explorer.exe process 15 that is launched at the user's log-on. Any processes launched normally through the user's initial desktop receive a duplicate of the explorer.exe process's 15 token 17, so all processes started during the user's session have the same user permissions—those defined at user log-on. If a user launches a process using a command such as "runas" that requires entering a new user and password, the LSA module 21 assigns a process token 17 that may contain new user permissions.

d) The directory service 16 and LSA store 14, which the LSA module 21 uses to look up each user on login to confirm the user name and password for authentication and to look up the groups to which the user belongs, which together determine the user's authorization. The directory service 16 (typically Microsoft's Active Directory) is located on another computer in the local network where the LSA module 21 can contact it. If the LSA module's 21 computer isn't connected to a directory service 16, a local LSA store 14 on the computer contains data that authenticates and authorizes a user at log-on.

e) A desktop object 19, which is a Windows data structure used to represent a virtual desktop in Windows. Each desktop object 19 stores the current user interface state for a virtual desktop: which windows are open and where they are located, which applications are running, where icons are located, and more. Each virtual desktop in Windows is linked to both a desktop object 19 to store its state and an instance of explorer.exe 15 to handle user interactions.

An additional component works with the previously described Windows components to create and manage virtual desktops:

a) A virtual desktop manager 12, which is an application (typically created by a third party) that allows a user to create and manage virtual desktops and to switch from desktop to desktop while the user is logged on. In one type of virtual desktop manager 12, whenever the user creates a new virtual desktop, the virtual desktop manager 12 creates a new instance of explorer.exe 15 and an accompanying desktop object 19 for the virtual desktop. Because each new explorer.exe process 15 is created within a single user session, the LSA module 21 assigns the same process token 17 (first assigned to the initial explorer.exe process 15) to all the new virtual desktops and therefore to each process started in each virtual desktop. Another type of virtual desktop manager 12 uses just a single instance of explorer.exe 15 and an accompanying desktop object 19 for all virtual desktops and simply hides applications and windows that do not belong to the virtual desktop currently on display.

Problems with Prior Art

Virtual desktops within a single user session cannot take full advantage of different levels of authorization offered on a computer or in a computer network.
Multiple User Accounts with Different Authority Levels Many computer users in a computer network have multiple user accounts, each account with a different level of authority for performing different types of activities. A network administrator may, for example, have a high-privilege user account for administration work that grants high-level permissions to use a wide variety of sensitive computer and network resources. He may have a second low-privilege user account with only low-level authorization for performing personal tasks such as reading email and web browsing.

The user logs onto a computer using an account that's appropriate for the tasks he intends to perform. If he is going to work as an administrator, he signs in with the administrator account. If he is going to do some personal work, he signs in with his personal account. This follows best security practices for network and personal work: never use an account with higher authority than is necessary to carry out your work. Using a higher-privilege account may trigger increased auditing of the user's activities, and it opens up opportunities to harm network resources that require high-level permissions to use.

Trying to use multiple accounts with virtual desktops, though, has problems as follows.
Multiple Authority Levels within a Virtual Desktop A user may execute programs at different authority levels within a virtual desktop using a command such as runas.exe. If so, the user has different levels of authority within the same desktop, but it is not readily apparent where those levels of authority exist. Different applications may have different levels of authority, and there is no outward sign which application has what authority.

A user in a multiple-authority desktop may be confused about what authority he has in which application. He may, for example, inadvertently perform low-privilege work in a word processor with high-level authority that allows him to make changes to high-privilege files that he should not be allowed to touch in his work. Or he may try to perform high-privilege work in an administrative tool that is not set up with the authority for him to do that work.

Mixed authority within a virtual desktop defeats the utility of virtual desktops: the ability to create a single environment for a specific type of work. It makes much more sense to set a single authority within a virtual desktop so there is no confusion about authority levels while working there.
Virtual Desktop Authorities in a Single Session All activities a user carries out normally during his session on a computer (without using an authorization-changing command such as runas.exe) execute using the authorization granted at log-on. If the user creates multiple virtual desktops in the session, all virtual desktops and applications within them execute using the same authority granted for the session. This means that if a user creates multiple virtual desktops, each to carry out activities that require different levels of authentication, the user must log on to the computer session using the highest-privilege account or else the highest-privilege desktops won't work.

For example, consider a user with the desktops previously described: one desktop for network administration, activities which require a high-privilege user account, and another desktop for personal web browsing, an activity that requires only a low-privilege user account. If the user logs onto a session using a low-privilege personal user account and then attempts to carry out high-privilege activities in the network administration desktop, they will not work without using a command such as "runas." To get all the virtual desktops to work, the user must log on using the high-privilege user account. Then both the network administration desktop and the personal desktop will work.

Using a high-privilege user account to perform low-privilege personal activities in the personal desktop violates the security principles previously described. This makes multiple virtual desktops of little use to security-conscious users who have to switch authorization levels while working with a computer. Instead of using virtual desktops, a network administrator either uses a command such as "runas.exe" or logs out of one session on the computer and logs onto a new session using a different account to change authority levels.

Logging out and logging back in again with new sessions takes time and requires memorizing multiple user names and passwords. Each new session typically resets the user's desktop, forgetting the previous window and tool layout that virtual desktops are designed to retain.

Although some operating systems offer a quick switch between different user sessions once started, there are some drawbacks there as well: Each session has a different user account, which can be confusing for audited systems because they can't detect that it is the same user who set up all sessions. Switching between user sessions requires entering a password each time for security, which takes time. When it is time for a user to log off, he must remember to log off all of his sessions instead of logging out of a single session that closes all open virtual desktops.

SUMMARY OF THE INVENTION

Embodiments of this invention augment switchable virtual desktops on a computer running a graphical user interface. When a user switches virtual desktops on the computer, the user's authorization (permissions to use computer resources) can change for each desktop without requiring the user to re-authenticate with the computer. Any processes the user starts in a virtual desktop run using the current desktop's authorization.

Embodiments of the invention allow a user to create virtual desktops within a single user session to set up multiple authorization environments on a computer. Each desktop may have a different level of authorization. A user may, for example, set up one virtual desktop to perform high-privilege tasks such as administering a database, and a second virtual desktop to perform common tasks such as browsing the web. The user can quickly switch back and forth between authorization levels by simply changing desktops, all without switching user sessions, which requires re-authentication.

These multiple desktop environments are particularly useful in an audited computer network where different levels of authorization trigger different levels of auditing (recording the user's activities). A user can quickly switch to a higher-privilege desktop only when necessary to perform high-privilege tasks, then switch back to a lower-privilege desktop to perform personal tasks that need not be audited.

BRIEF DESCRIPTION OF THE DRAWINGS

Embodiments of the invention are illustrated by way of example and not by way of limitation in the figures of the accompanying drawings in which like references indicate similar elements. Note that references to "an" or "one" embodiment in this disclosure are not necessarily to the same embodiment, and such references mean "at least one."

DETAILED DESCRIPTION OF THE INVENTION

Figure 2:
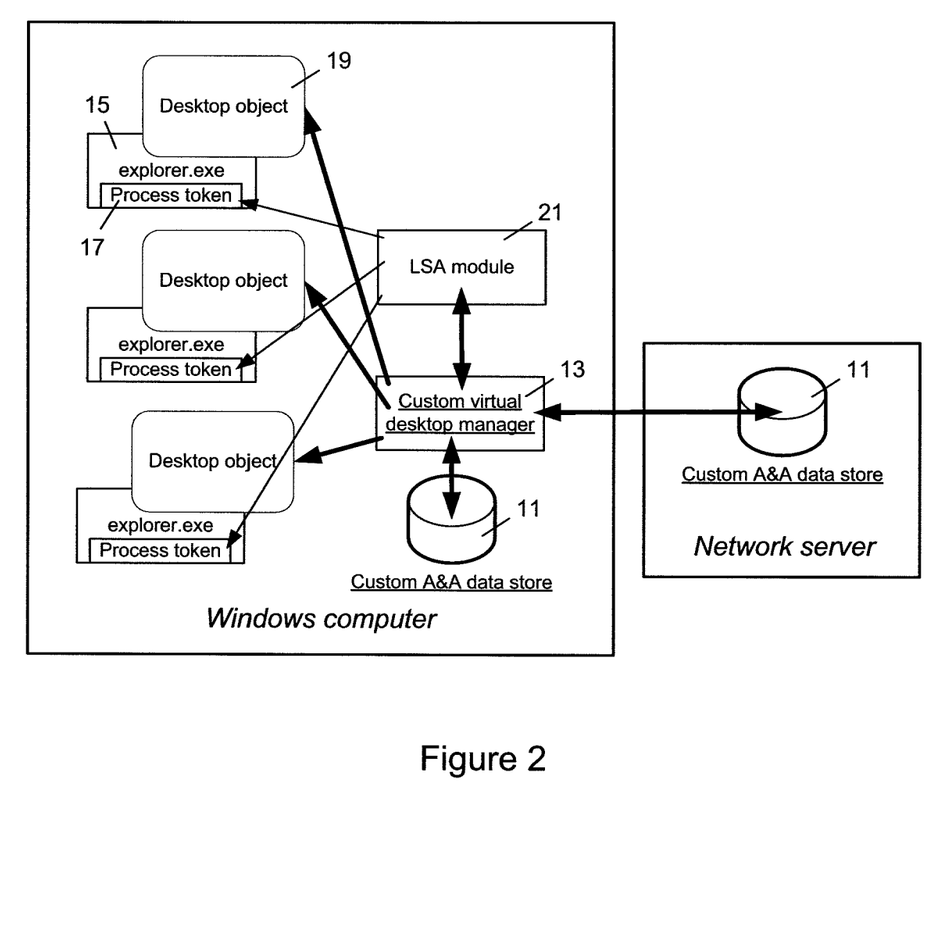
FIG. 2 is a block diagram that shows the components of an embodiment of the invention as they exist within a Windows computer and on the network server with which the Windows computer communicates. These components' names are underlined in the diagram.

An embodiment of the invention performs its functions in the Windows operating system. FIG. 1 shows components present in prior art that present virtual desktops to a user. FIG. 2 shows components present for an embodiment of the invention in the Windows operating system. Those components are:

a) A custom authentication and authorization (A&A) data store 11 that defines special permission sets called "roles" that may be assigned to each user. This component replaces the directory service 16 and LSA store 14 in the prior art.

b) A custom virtual desktop manager 13 that handles standard virtual desktop management such as creating, switching, and destroying virtual desktops. It also has the ability to specify custom process tokens 17 so that each virtual desktop may have a process token 17 that defines different permissions within a single session. This component replaces the virtual desktop manager 12 in prior art.

The components of an embodiment of the invention work with components within the Windows operating system described earlier as prior art:

a) The explorer.exe task 15, a Windows version of a user shell that handles user interactions behind each virtual desktop.

b) Process tokens 17, each of which determines a set of permissions that a process such as explorer.exe has when executing.

c) A desktop object 19 that is a data structure representing a virtual desktop.

d) The Local Security Authority (LSA) module 21 that requests and assigns process tokens to process running in Windows.

The Custom Authentication and Authorization (A&A) Store 11

The custom A&A data store 11 defines a set of "user roles" that each define a set of permissions that may be assigned to a user in a virtual desktop. User roles and the permissions they assign may be defined in many ways as long as the custom virtual desktop manager 13 knows how to interpret those permissions and create a corresponding process token 17.

Figure 3:
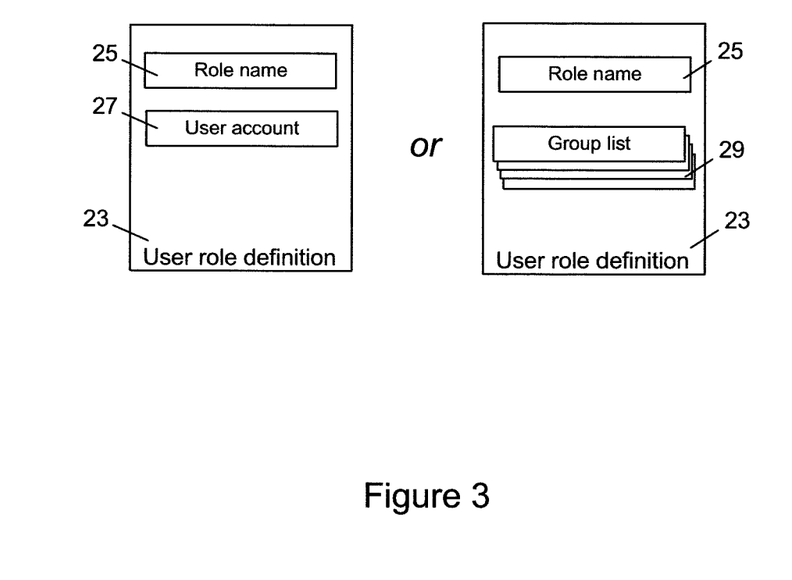
FIG. 3 is a block diagram that shows the two different ways a role definition may be defined by an embodiment of the invention.

FIG. 3 illustrates how, in an implementation of the invention, each user role definition 23 specifies a role name 25 and a "right" that in turn specifies the permissions that the role receives. A right is defined as either:

a) An existing user account 27 with a desired level of authorization. For example, it might be the account "admin," which might belong to numerous high-privilege groups that grant extensive permissions to work with multiple computers throughout a network. Or:

b) A list of existing groups 29 that together define a desired level of authorization. For example, a right might define the same set of permissions described previously for the account "admin" by listing all the groups to which the account belongs.

The set of user role definitions 23 within the custom A&A data store 11 provide different levels of defined authorization. For example, a role named "network admin" might define extensive permissions to work with multiple computers throughout a network as described earlier, while a role named "operator" may be limited to small set of permissions on only one or more computers. A user may assume different roles during a session, which gives the user different permissions at different times during that session.

Figure 4:
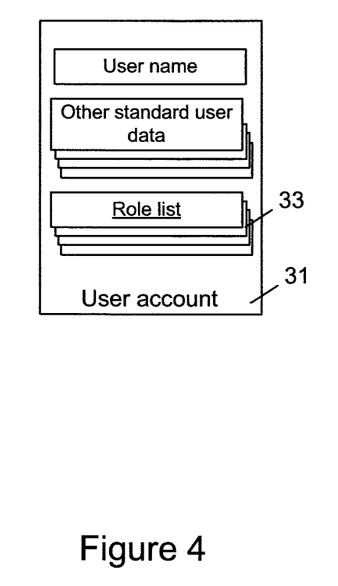
FIG. 4 is a block diagram that shows the contents of a user account in the custom A&A data store used by an embodiment of the invention.

FIG. 4 shows how the custom A&A data store 11 in an embodiment of the invention adds to each user account 31 a list of 33 one or more roles that the user may assume. A user may not assume a role that is not listed in the user's account.

The Custom Virtual Desktop Manager 13

Figure 5:
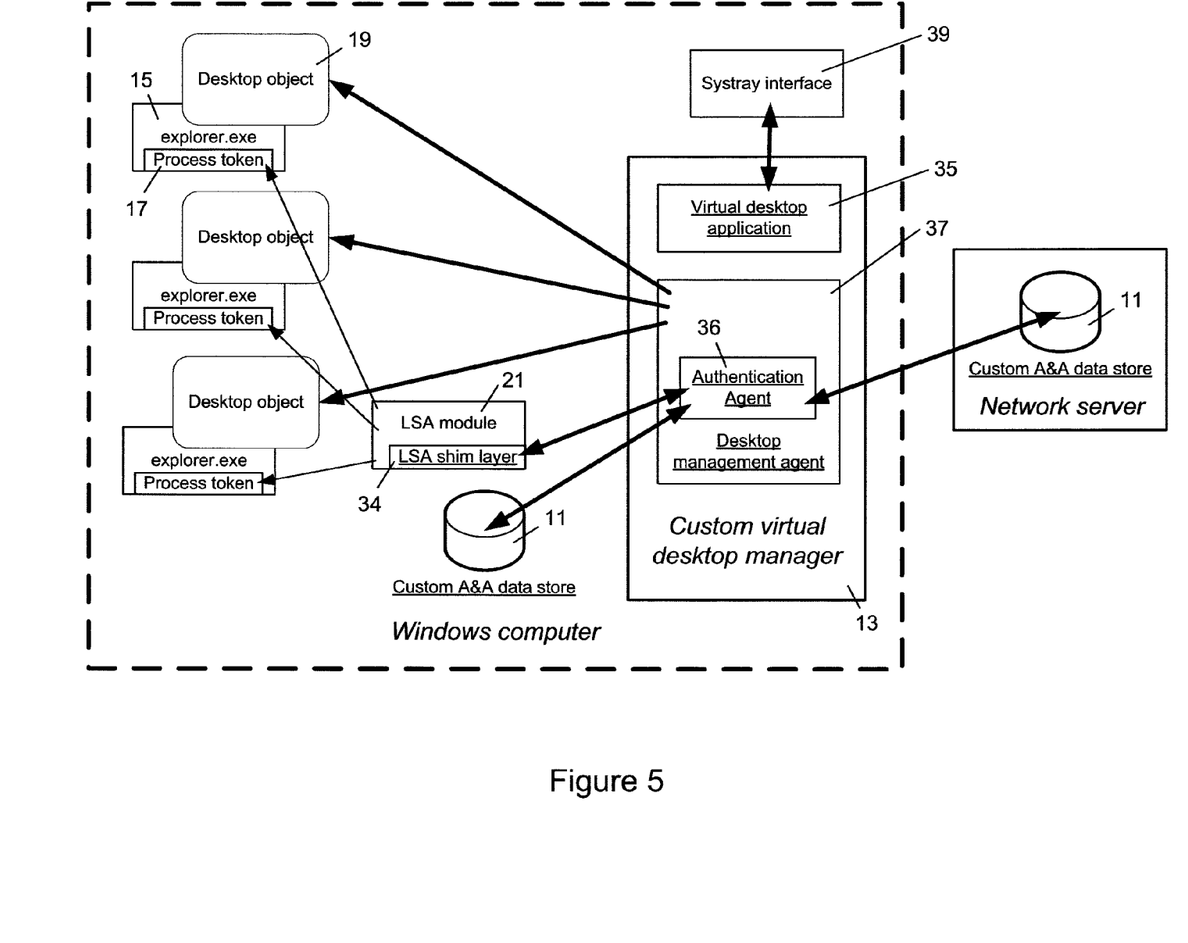
FIG. 5 is a block diagram that shows the parts of the custom virtual desktop manager, a component of an embodiment of the invention, and where those parts reside in relationship to Windows components and other components of an embodiment of the invention. The names of the components belonging to an embodiment of the invention are underlined.

FIG. 5 shows the parts of the custom virtual desktop manager 13 in an embodiment of the invention and how they connect with the other components in the Windows environment. The two main parts of the custom virtual desktop manager are:

a) A virtual desktop application 35 to provide a user interface where the user can manage virtual desktops and specify a role for each desktop.

b) A desktop management agent 37 that connects to the custom A&A store 11 and the LSA module 21. The agent creates and destroys virtual desktops and creates custom process tokens for new desktops.

The desktop management agent 37 incorporates two components as follows:

i) An LSA shim layer 34 that resides in the LSA module 21 and communicates with the custom virtual desktop manager 13 via the authentication agent 36 (described below). The LSA shim layer 34 can intercept requests that the LSA module 21 receives for new process tokens 17 and can specify the contents of the process tokens 17 that the LSA module 21 creates.

ii) An authentication agent 36 that communicates with the LSA module 21 and the custom A&A data store 11. The custom virtual desktop manager 13 uses the authentication agent 36 to learn of activities in the LSA module, to check data in the custom A&A data store 11, and to specify the contents of process tokens 17 for new virtual desktops.

The Virtual Desktop Application 35

The virtual desktop application 35 in an implementation of the invention launches when a user logs onto the computer. The user opens the application from the systray interface 39, a group of icons usually on the bottom right of the Windows screen. The virtual desktop application 35 provides a set of controls that allows a user to create a new virtual desktop, specify a role for each new desktop, switch from one desktop to another, and to define hot-key combinations that will automatically switch from one desktop to another.

The virtual desktop application 35 runs in the background during a session to monitor keystrokes, detect the hot-key combinations, and switch virtual desktops on hot-key detection.

The virtual desktop application 35 is primarily the user interface for virtual desktop management. It contacts the desktop management agent 37 to create and destroy desktops.

The Desktop Management Agent 37

The desktop management agent 37 in an implementation of the invention is connected to the custom A&A data store 11 so that the management agent 37 can check to see what roles a logged-in user is allowed to use. When a user requests a new virtual desktop and specifies a role for the desktop, the management agent 37 looks at the user account 31 in the custom A&A data store 11 to see if the role is allowed. If it is not allowed, the management agent 37 prompts the user to use a different role through the virtual desktop application 35.

If the role is allowed, the management agent 37 creates a new desktop object 19 and accompanying explorer.exe process 15 to implement the new desktop. When asked to create a new explorer.exe process, Windows contacts the LSA module 21 for authorization data that the Windows kernel uses to create a process token to assign to the new process.

The management agent 37 is connected to the LSA module 21 through the authentication agent 36 and the LSA shim layer 34 and intercepts requests for process tokens 17 when Windows creates new processes. The LSA shim layer 34 is a plug-in for the Microsoft LSA module 21. The shim layer 34 registers with the LSA module 21 when the software is installed. When the shim layer 34 registers, it first unregisters Microsoft's LSA plug-ins and then registers itself, identifying itself as those plug-ins. The LSA module 21 then believes the LSA shim layer 34 is the standard Microsoft plug-ins, and calls the shim layer 34 instead of the Microsoft plug-ins.

The shim layer 34 keeps the Microsoft LSA plug-ins in place and may call those plug-ins whenever required. The shim layer 34 thus stands between the LSA module 21 and the Microsoft plug-ins, intercepting calls whenever it wishes to process the calls, passing on other calls to the Microsoft plug-ins when the shim layer 34 does not need to process the calls. When the Microsoft plug-ins respond, the shim layer 34 passes the responses back to the LSA module 21. The shim layer 34 may, if desired, modify Microsoft plug-in responses before passing them back to the LSA module 21.

Implementations of the invention can set the shim layer 34 to intercept and act on any number of call types from the LSA 21. Those calls may include, for example, LsaLogonUserEx2 API calls. The shim layer 34 passes on all other calls from the LSA module 21 to the Microsoft plug-ins. This ensures that the Microsoft plug-ins correctly handle all other calls, and that when the Microsoft plug-ins are updated with a security patch the updates work as intended.

When Windows requests a process token 17 for the new explorer.exe instance 15, the management agent 37 intercepts the request through the shim layer 34. The management agent 37 specifies a user name and a list of groups used to create that process token 17. The list of groups defines the permissions associated with the role for the new virtual desktop.

In an implementation of the invention, the management agent 37 specifies permissions for a process token 17 by contacting the custom A&A data store 11, looking up the requested role definition 23, and retrieving either the user account 27 or the group list 29 defined by the role's right. If the right is a user account 27, the management agent 37 retrieves the list of groups defined for the user account. If the role is a list of groups 29, the management agent 37 simply retrieves that list.

The management agent 37 then specifies contents for a process token 17. Those contents depend on the role definition 23. If the role definition 23 specifies a user account 27, the management agent 37 specifies that account's user name for the process token 17, looks up the groups associated with the user account 27, and specifies those groups for the process token 17. If the role definition 23 specifies a list of groups 29, the management agent 37 specifies the user name of the requesting user (who asked for the new virtual desktop) for the process token 17 and then specifies the role's groups along with the groups associated with the user for the token 17. In other implementations of the invention that may define roles differently, the management agent 37 may interpret role definitions 23 in a different manner to turn them into a list of groups in the token 17.

The management agent 37 gives its specified contents for the process token 17 through the LSA shim layer 34 to the LSA module 21, which uses the contents to request a process token 17 from Windows. Windows creates a process token 17 containing the contents defined by the management agent 37 and assigns the process token 17 to the new explorer.exe process 15.

The new virtual desktop now has an associated explorer.exe process 15 with a custom process token 17 that gives the desktop the permissions granted by the role specified for the desktop. When the user launches a new process in the desktop, Windows assigns the desktop's process token to the new process. All processes the user starts in the virtual desktop have the same permissions as the desktop's role.

If a user creates two or more virtual desktops, each with a different role, then each desktop has a different set of permissions under which it and its associated processes execute. Switching between two virtual desktops with different roles now switches permission sets as well.

Creating a New Virtual Desktop

Figure 6A:
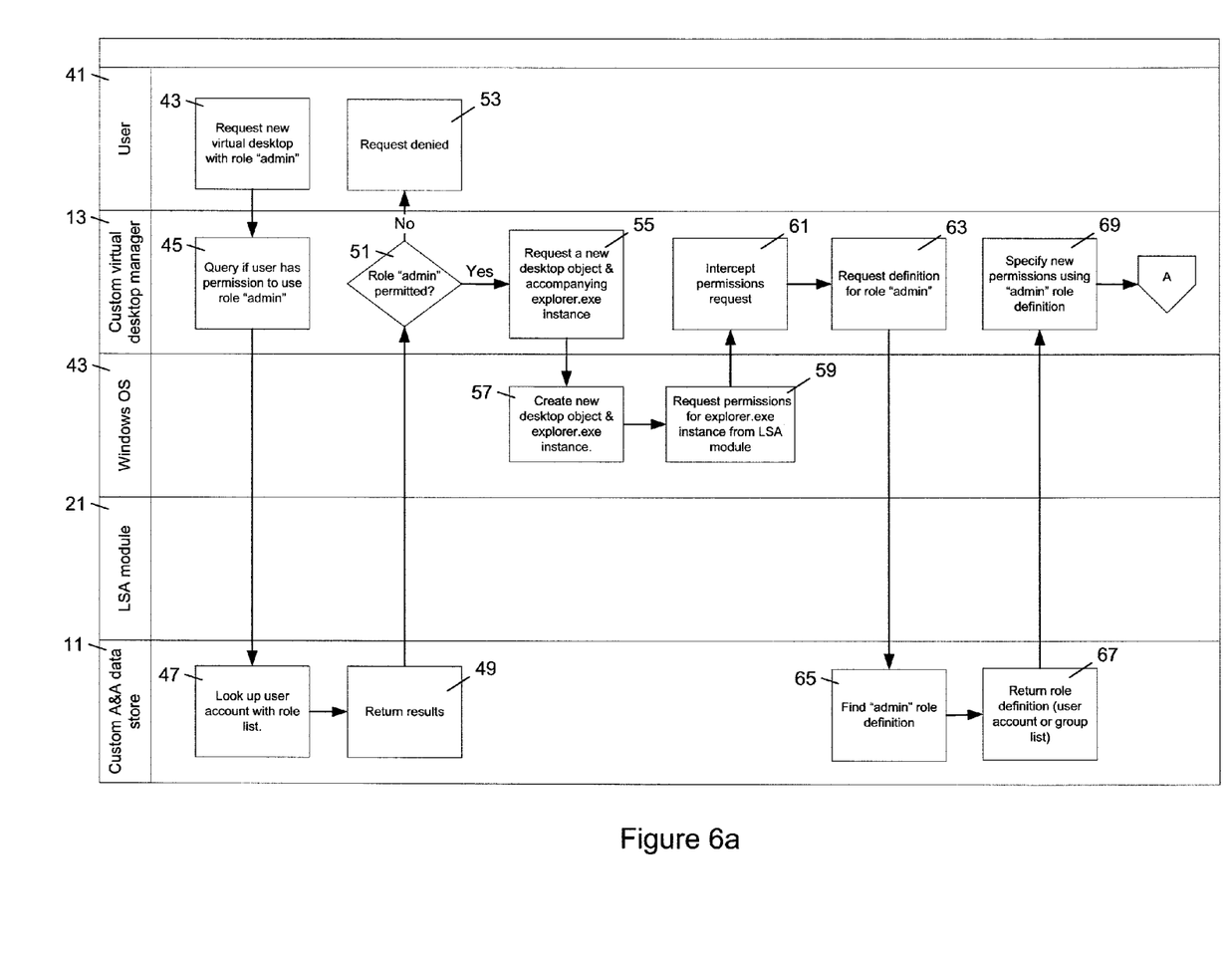
FIGS. 6*a* and 6*b* are a flowchart that shows how a user uses an embodiment of the invention to create a virtual desktop with the authorization of an "admin" role.
Figure 6B:
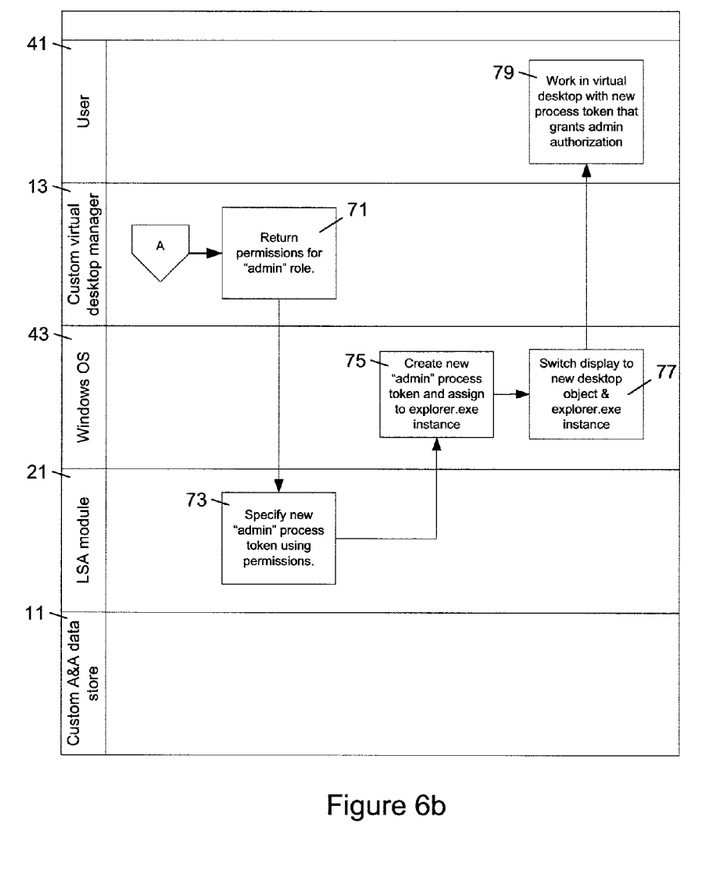

FIGS. 6a and 6b are a flow chart that illustrates the process that occurs when a user 41 creates a new virtual desktop with a new role using an embodiment of the invention.

A user 41 requests 43 a new virtual desktop with the role "admin." The custom virtual desktop manager 13 receives the request and queries 45 the custom A&A data store 11 to see if the user 41 has permission to use the role "admin." The data store 11 looks up 47 the user's account 31 that contains a list of roles 33 the user may use and returns 49 the results to the custom virtual desktop manager 13.

The custom virtual desktop manager 13 uses the results to determine 51 if the role "admin" is permitted or not. If it is not permitted, the user 41 is denied 53 his request for the new virtual desktop.

If the role "admin" is permitted, the custom virtual desktop manager 13 requests 55 the Windows OS 43 for a new desktop object 19 with an accompanying explorer.exe instance 15. The Windows OS 43 creates 57 the requested desktop object 19 and explorer.exe instance 15, then requests 59 the LSA module 21 for the permissions to use for the explorer.exe instance 15.

The custom virtual desktop manager 13 intercepts 61 the Windows OS 43 request to the LSA module 21. The manager 13 then requests 63 the custom A&A data store 11 for the role definition 23 for the role "admin." The data store 11 finds 65 the admin role definition 23 and returns 67 the definition 23. The definition 23 may specify either a user account 27 or a group list 29. The manager 13 uses the returned role definition 23 to specify 69 new permissions for the explorer.exe instance 15 and then returns 71 those permissions to the LSA module 21.

The LSA module 21 specifies 73 to the Windows OS 43 a new process token 17 for the explorer.exe instance 15 using the received permissions. The Windows OS 43 creates 75 a new process token 17 contains the received "admin" permissions and assigns the token 17 to the explorer.exe instance 15. The Windows OS 43 then switches the display to the new desktop object 19 and explorer.exe instance to present a new virtual desktop to the user 41.

The user 41 now works 79 in the new virtual desktop with a new process token 17 that grants "admin"-level authorization to all the processes the user 41 works with in the virtual desktop.

Switching Virtual Desktops

Figure 7:
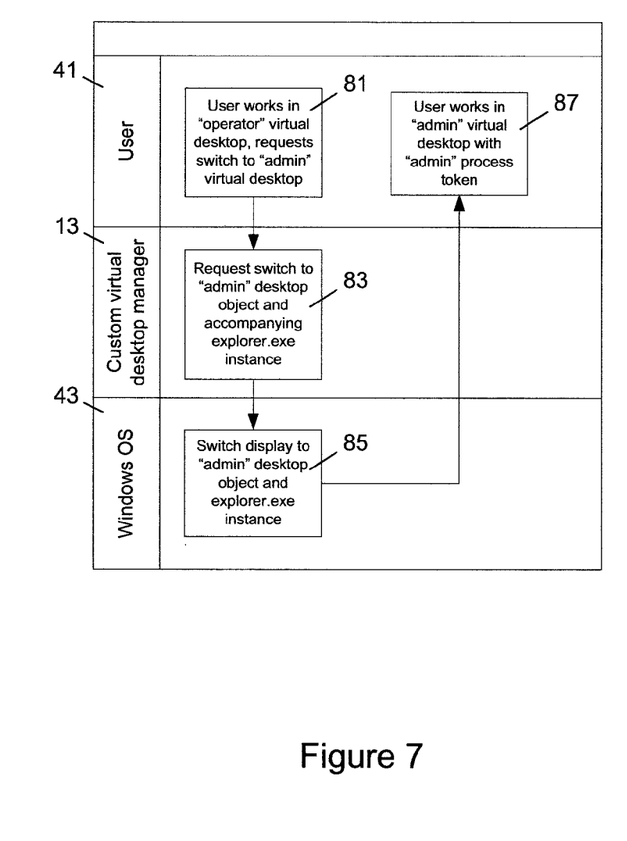
FIG. 7 is a flowchart that shows how a user switches from one virtual desktop to another using an embodiment of the invention.

FIG. 7 is a flow chart that illustrates the process that occurs when a user 41 uses an embodiment of the invention to switch from one virtual desktop with an "operator" role that limits authorization (and has an "operator" process token 17) to a second virtual desktop with an "admin" role with much fuller authorization (and an "admin" process token 17).

The user 41 works 81 in a virtual desktop with the "operator" role and requests to switch to an "admin" virtual desktop. The custom virtual desktop manager 13 requests the Windows OS 43 to switch to the "admin" desktop with its accompanying explorer.exe instance 15.

The Windows OS 43 responds by switching its display to the desktop object 19 and accompanying explorer.exe instance 15 for the requested virtual desktop. The user 41 now works in the "admin" virtual desktop and performs all his work with the permissions granted by the "admin" process token 17.

Note that this process is much the same as the process for switching virtual desktops in prior art except for the fact that the two desktops now have separate process tokens 17 and therefore grant different authorization. The components of an embodiment of the invention set this capability up when creating the virtual desktops.

OTHER IMPLEMENTATIONS OF THE INVENTION

The invention may be implemented in alternative ways. One simpler implementation eliminates the custom A&A data store 11 and the mechanism of user roles. The custom virtual desktop manager 13 in this simpler implementation creates a new virtual desktop by creating a desktop object 19/explorer.exe 15 pair just as some prior-art virtual desktop managers do.

The custom manager 13, however, starts the new explorer.exe process 15 by using the runas.exe command and supplying a new user account 31 under which to run the new explorer.exe process 15. Windows 43 assigns a new process token 17 to the new explorer.exe process 15 that reflects the permissions of the newly supplied user account 31. The newly created virtual desktop then has an independent authorization that reflects the supplied user account's 31 authorization.

This simpler implementation does not require the custom virtual desktop manager 13 to look up user roles, monitor the LSA module 21, or intercept process token 17 requests. The implementation does, however, require that the user who requests a new virtual desktop must supply a valid user name and accompanying password to authenticate a desktop with changed authorization. The previously described implementation does not require re-authentication for each new virtual desktop with changed authorization.

Other implementations of the invention may occur on non-Windows platforms such as UNIX-based platforms. These implementations may work in much the same way as the simpler implementation just described. They may depend on a user-account-changing execution command such as runas.exe in Windows or sudo on a UNIX-based platform. The account-changing command allows the custom virtual desktop manager to create new virtual desktops with independent authorizations.

An embodiment of the invention may be a machine-readable medium having stored thereon instructions which cause a processor to perform operations as described above. In other embodiments the operations might be performed by specific hardware components that contain hardwired logic. Those operations might alternatively be performed by any combination of programmed computer components and custom hardware components.

A machine-readable medium may include any mechanism for storing or transmitting information in a form readable by any type of processing device.

Although specific examples of how the invention may be implemented are described, the invention is not limited by the specified examples, and is limited only by the scope of the following claims.

The invention claimed is:

1. A system for creating switchable virtual desktops each requiring a different user authorization comprising:
 a) at least one memory;
 b) an authentication and authorization (A&A) data store configured to store roles assigned to each user in said at least one memory;
 c) a virtual desktop manager including a desktop management agent and a virtual desktop application configured to provide a user interface to enable a user to manage said virtual desktops on a single user device and specify a role for each said virtual desktop, said virtual desktop manager configured to enable creating, switching, and destroying virtual desktops and to specify process tokens for each said virtual desktop, said process tokens defining different permissions with a single session, wherein the virtual desktop application launches when said user i) logs onto a computer, ii) creates a new virtual desktop, and requests a role for said new virtual desktop, and upon request by said user, initiates a switch from said new virtual desktop to another virtual desktop;

wherein said A&A data store and virtual desktop manager operate cooperatively to generate a plurality of data structures stored in said at least one memory, each representing one of said virtual desktops, so that when said user requests said switch from a first virtual desktop to a second virtual desktop, each requiring a different user authorization, the user's authorization automatically changes to an authorization associated with said second virtual desktop without requiring the user to re-authenticate with said second virtual desktop, and wherein the desktop management agent is connected to the A&A data store to determine if the requested role is allowed, and i) when said requested role is determined to be allowed, the desktop management agent creates said new virtual desktop, a desktop object and an accompanying user shell process to implement the new virtual desktop, ii) when said role is determined to not be allowed, the desktop management agent causes the virtual desktop application to prompt the user to use a different role, wherein the desktop management agent is connected to an LSA module and is configured to intercept requests for process tokens when an operating system creates new processes.

2. The system defined by claim 1 wherein the A&A data store when storing said assigned user roles defines a set of permissions assigned to a user in a virtual desktop, which permissions are interpreted by said virtual desktop manager to create a corresponding process token.

3. The system defined by claim 1 wherein said desktop management agent is configured to create process tokens for said new virtual desktops.

4. The system defined by claim 1 wherein the virtual desktop application defines hot-key combinations to automatically switch from one virtual desktop to another.

5. The system defined by claim 1 wherein the desktop management agent is connected to the A&A data store and said desktop management agent is configured to determine the roles a logged-in user is allowed to use.

6. The system defined by claim 1 wherein the desktop management agent being connected to the LSA module is configured via an LSA shim layer to intercept said requests for process tokens when the operating system creates new processes and specifies a list of groups used to create the requested process tokens wherein the list of groups defines the permissions associated with the role for a created virtual desktop.

7. The system defined by claim 6 wherein the created virtual desktop has an associated user shell process with a process token that gives the created virtual desktop the permissions granted by the role specified for the created virtual desktop, and when the user launches a new process in the created virtual desktop, the operating system assigns the desktop's process token to the new process enabling switching between two virtual desktops with different roles to also switch permission sets.

8. The system defined by claim 1 wherein the desktop management agent being connected to the LSA module is configured via an LSA shim layer to intercept said requests for process tokens when the operating system creates new processes and specifies a user name used to create the requested process tokens wherein the user name defines the permissions associated with the role for a created virtual desktop.

9. A method for creating switchable virtual desktops each requiring a different user authorization comprising:

a) requesting a new virtual desktop with a new role from a first virtual desktop;

b) receiving the request and querying an authentication and authorization (A&A) data store to selectively determine if a user making the request has permission to use the requested role, and when said user making the request is determined to have said permission, said data store looking up the user's account in the A&A data store for a list of roles the user is assigned and returning the results to a virtual desktop manager, said A&A data store including roles assigned to each user;

the virtual desktop manager creating, switching, and destroying virtual desktops and specifying process tokens for each said virtual desktop, said process tokens defining different permissions within a single session, c) the virtual desktop manager including a desktop management agent connected to the A&A data store and the desktop management agent looking at a user account in the A&A data store to determine if the requested role is allowed, and when the role requested is determined to be allowed, i) requesting an operating system for a new desktop object, said operating system creating the requested desktop object;

ii) requesting the A&A data store for a role definition for the requested role;

iii) locating the role definition for the requested role and returning the role definition, the role definition specifying at least one of a user account and a group list; and iv) using the returned role definition to create the new virtual desktop so that when a user on a single user device switches from the first virtual desktop to a second virtual desktop, and said first and second virtual desktops require a different user authorization, the user's authorization automatically changes to an authorization associated with said second virtual desktop without requiring the user to re-authenticate with said second virtual desktop, and wherein the desktop management agent is connected to the A&A data store and the desktop management agent looks at a user account in the A&A data store to determine if the requested role is allowed, and when said role is determined to not be allowed, the desktop management agent causes the virtual desktop application to prompt the user to use a different role, wherein the desktop management agent is connected to an LSA module and is configured to intercept requests for process tokens when an operating system creates new processes.

10. The method defined by claim 9 further comprising:

requesting a switch from a first virtual desktop corresponding to a first role to a second virtual desktop corresponding to a second, different role, by switching a display from a first desktop object to a second desktop object.

* * * * *